J. J. HEYS.
HEEL SEAT ROUGH ROUNDER.
APPLICATION FILED APR. 5, 1906.

1,005,545.

Patented Oct. 10, 1911.

4 SHEETS—SHEET 1.

Witnesses:
Horace H. Crossman
Robert H. Kammler

Inventor:
John J. Heys
by Emery & Booth,
Attys.

J. J. HEYS.
HEEL SEAT ROUGH ROUNDER.
APPLICATION FILED APR. 5, 1906.
1,005,545.
Patented Oct. 10, 1911.
4 SHEETS—SHEET 2.
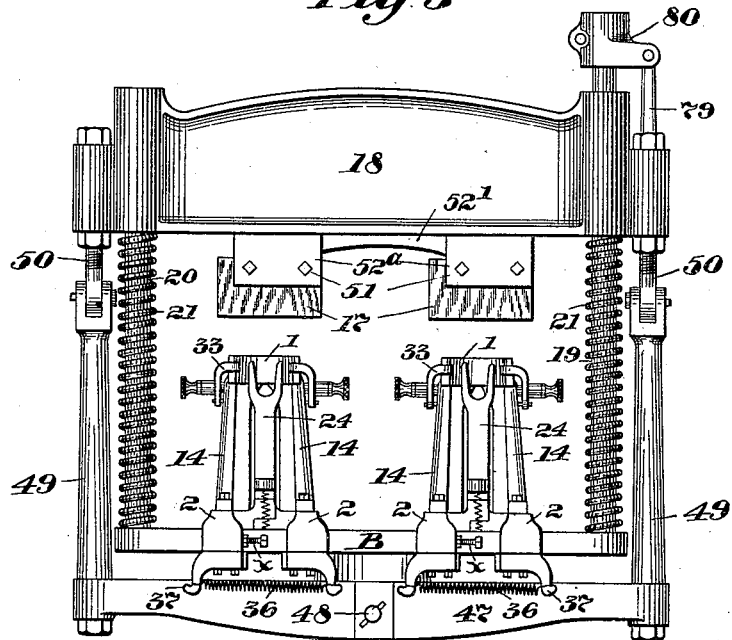
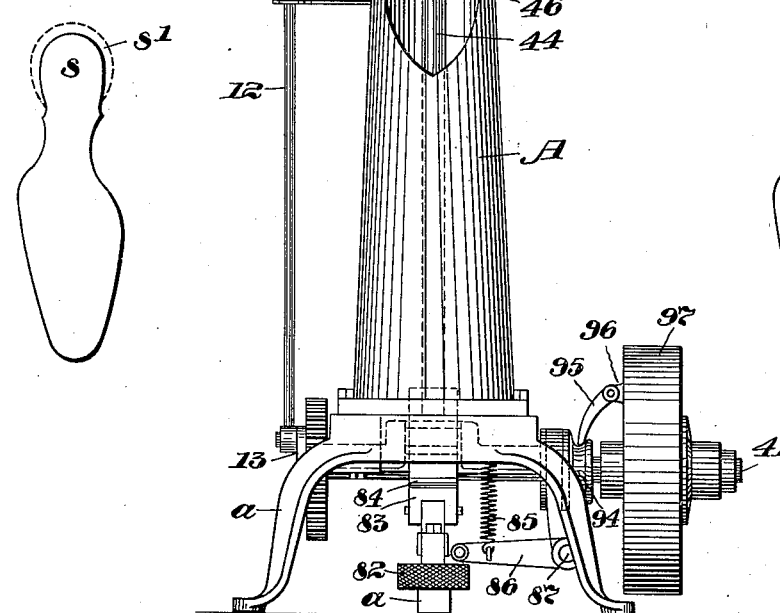
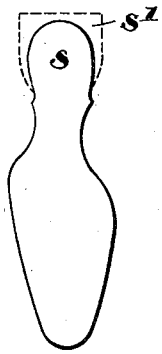
Witnesses:
Horace A. Crossman
Robert H. Kammler
Inventor:
John J. Heys.
by Emery & Booth
Attys J. J. HEYS.
HEEL SEAT ROUGH ROUNDER.
APPLICATION FILED APR. 5, 1906.
1,005,545.
Patented Oct. 10, 1911.
4 SHEETS—SHEET 3.
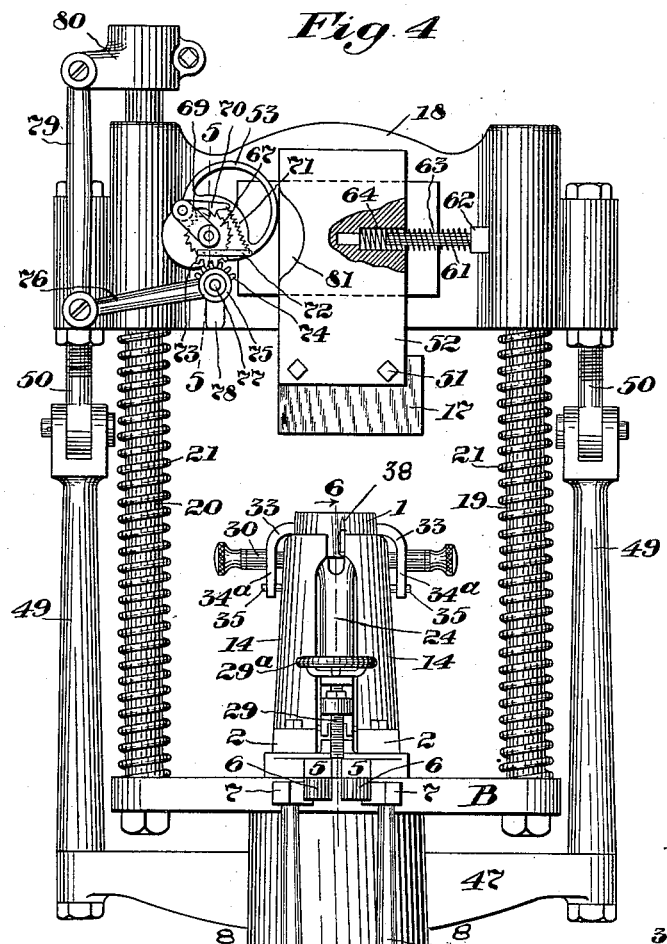
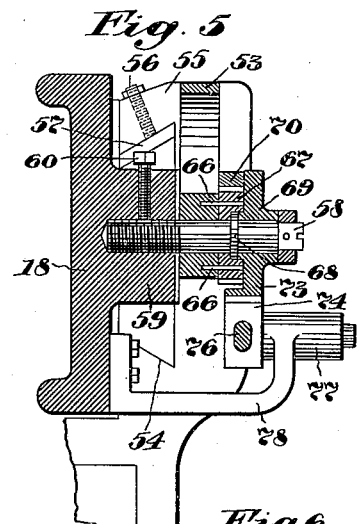
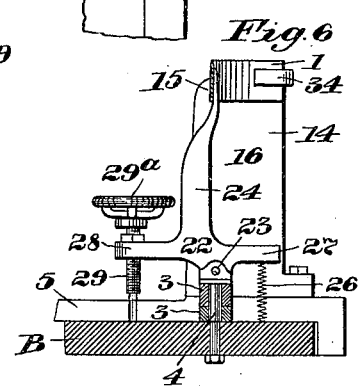
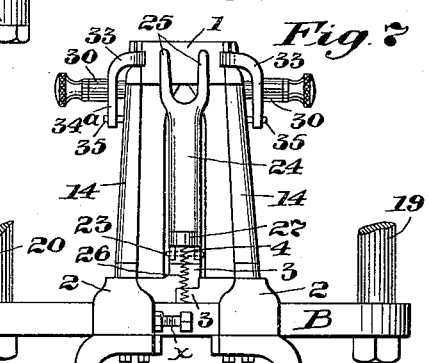
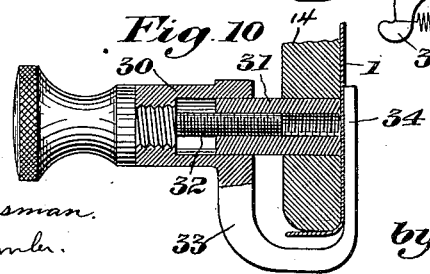
Witnesses:
Horace A. Crossman.
Robert H. Kammler.
Inventor:
John J. Heys.
by Emery & Booth
Attys.

J. J. HEYS.
HEEL SEAT ROUGH ROUNDER.
APPLICATION FILED APR. 5, 1906.
1,005,545.
Patented Oct. 10, 1911.
4 SHEETS—SHEET 4.
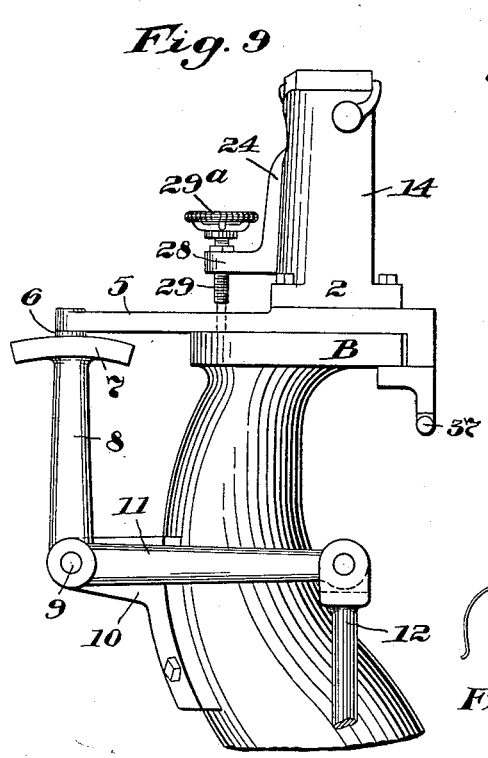
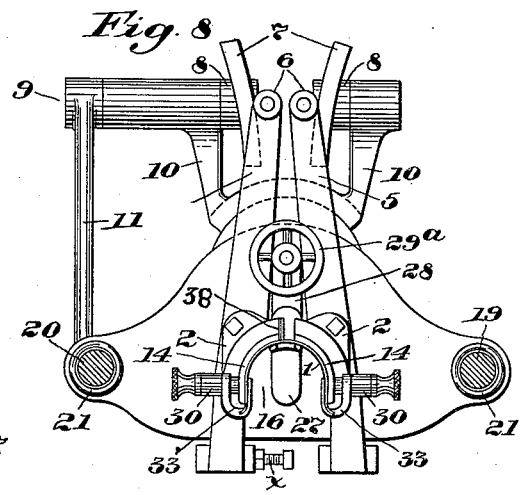
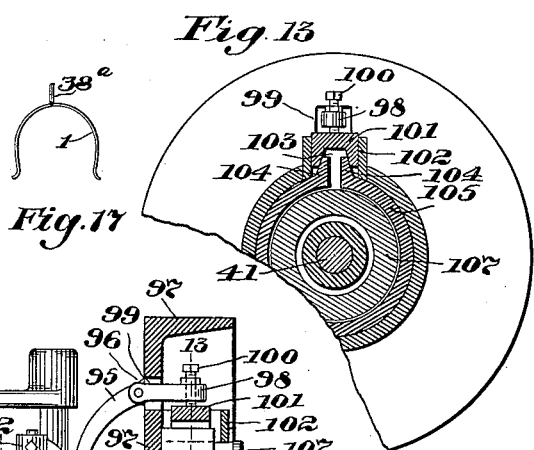
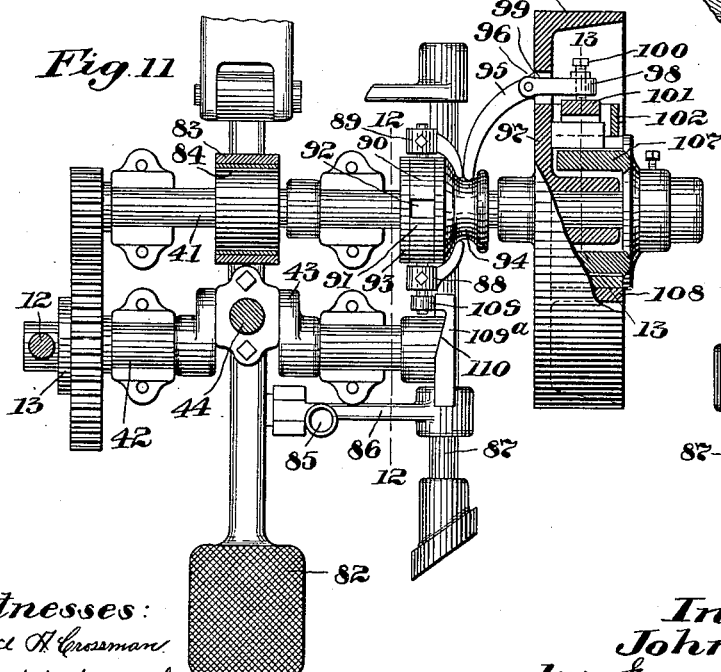
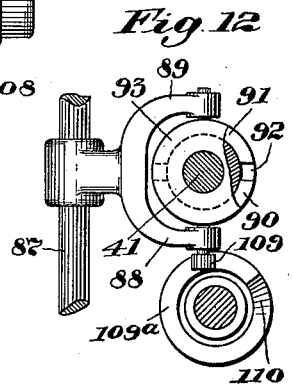
Witnesses:
Horace H. Crossman
Robert H. Kammler
Inventor:
John J. Heys.
by Emery & Booth,
Attys.

UNITED STATES PATENT OFFICE.

JOHN J. HEYS, OF LYNN, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

HEEL-SEAT ROUGH-ROUNDER.

1,005,545.

Specification of Letters Patent.

Patented Oct. 10, 1911.

Application filed April 5, 1906. Serial No. 309,997.

*To all whom it may concern:*

Be it known that I, JOHN J. HEYS, a citizen of the United States, residing at Lynn, in the county of Essex and Commonwealth of Massachusetts, have invented an Improvement in Heel-Seat Rough-Rounders, of which the following description, in connection with the accompanying drawings, is a specification, like letters on the drawings representing like parts.

My invention relates to a machine for rough-rounding or dying-out the heel-seats or heel-portions of the soles of boots and shoes, and particularly to a type of machine employing a reciprocatory pressing-block, coöperating with a dying-out knife, to remove the marginal material from the heel-seat.

The object of my invention is to provide means for removing marginal material from the heel-seats or heel-portions of soles after the sole has been secured to the upper and before the heel has been nailed to the heel-seat, or the heel portions of the sole have been trimmed.

The various features of my invention will be best understood and more thoroughly appreciated from the following description, when taken in connection with the accompanying drawings of a machine illustrating one embodiment of my invention, its scope being more particularly pointed out in the appended claims.

It is to be understood, however, that my invention is not limited to the embodiment here selected for illustrative purposes.

Figure 1:
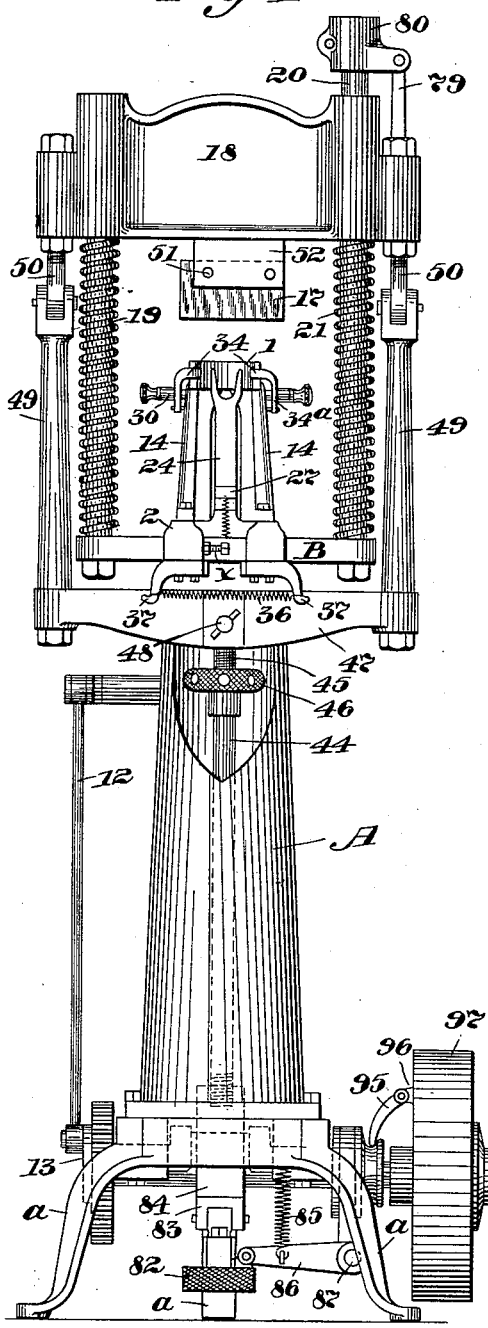
Figure 2:
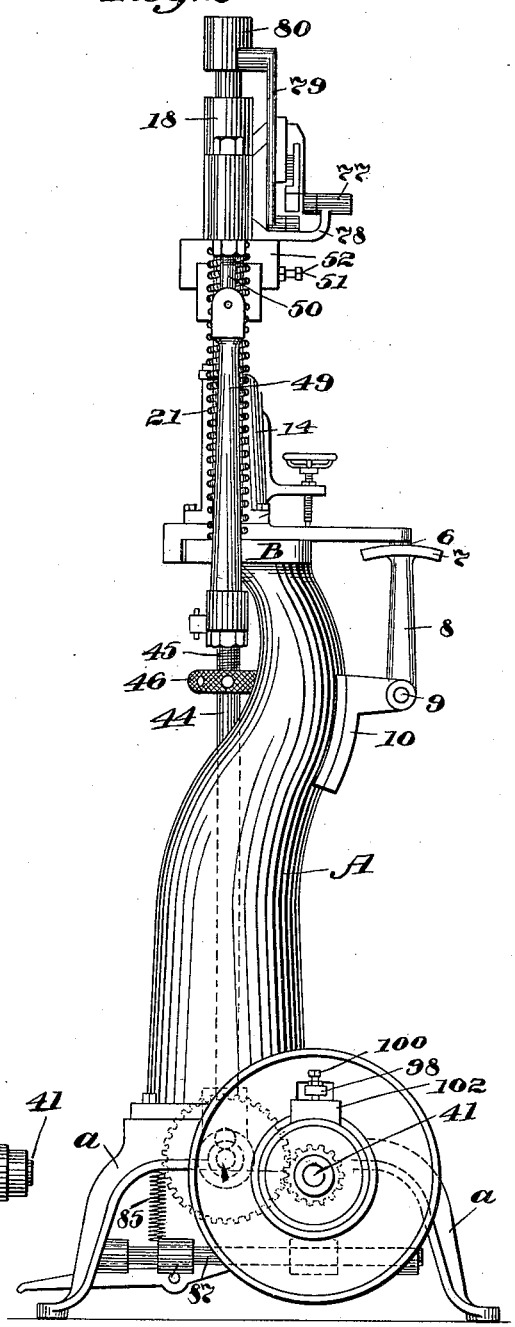

Referring to the drawings,—Figure 1 is a front elevation of a machine embodying one form of my invention selected for purpose of illustration; Fig. 2, an elevation of the right side thereof; Fig. 3, a front elevation of a twin or double machine; Fig. 4, an enlarged rear elevation of the head of the machine showing the knife-rounding device and the cam with its operating mechanism for sliding the presser block laterally; Fig. 5, an enlarged vertical cross-section taken through the axis of the block moving cam, on the line 5—5, Fig. 4; Fig. 6, a vertical section of the rounding knife and its supporting carrier with the rear gage, taken from the right, on the line 6—6, Fig. 4; Figs. 7 and 8 respectively represent an enlarged front elevation and plan thereof; Fig. 9 is a partial elevation on the left side of said machine to show the rounding knife, its supports, and the adjusting mechanism therefor; Fig. 10, an enlarged detail partially in section of one of the side gages; Fig. 11, a plan view of the operating mechanism at the base of the machine, the standard being removed; Fig. 12, a sectional detail of the clutch-actuating yoke and controlling cam taken from the left on the line 12—12, Fig. 11; Fig. 13, a vertical section on line 13—13, Fig. 11; Figs. 14 and 15 are plan views of block soles showing in dotted lines the marginal portions to be removed from each by the rounding knife or die cutters; Fig. 16, is an elevational detail of the scrap knife riveted into the back of the rounding knife; and Fig. 17 is a plan view of the dying out or rounding knife.

In the embodiment of my invention herein illustrated (see Figs. 1, 2 and 3) the machine is provided with a hollow standard A having supporting legs $a$, and provided with a bed B, upon which are two supporting carriers, 2, for the rounding knife 1. These supporting carriers 2, are formed respectively at their inner edges (see Figs. 6 and 7) with hinge ears 3 drilled to receive the hinged bolt or pivot stud 4, by which said carriers 2 are pivotally mounted on the bed B, enabling them to be opened and closed like a hinge set on end. The base of each of these pivoted carriers 2, is provided with a rearwardly extending arm 5 (Figs. 8 and 9) carrying a roller 6, at its outer end, bearing and running upon the arc-shaped cam 7, which is formed at the upper end of a vertical arm 8 of the horizontal rock shaft 9, journaled in the bracket 10 of the column, there being one arm 8 and cam 7, for each of the said rollers 6. The outer end of this rock shaft, 9, has a horizontal arm, 11, pivotally connected to the upper end of a connecting rod 12, the lower end of which is pivoted to and operated by a crank 13, on the outer end of a counter shaft 42, subsequently to be described. In the operation of the machine, said rock shaft 9, and its arm 8, are oscillated, to cause the rollers 6 of the carrier arms 5, to swing in and out for a purpose that will presently be made clear. Rising from the lower and inner edges of each of said carriers 2, is a vertical flange, 14, curved or arc shaped in cross section which is provided at its top with a groove or rabbet, 15, to receive and support the U-shaped rounding or dying-out knife, 1, suitably secured thereon and made of flexible steel ribbon, sharpened at its upper edge, and having sufficient resiliency to cause it always to spread, following any opening of its hinged carriers 2, and always to retain its seat thereon. Between said flanges 14, (see Fig. 8), is presented a heel-shaped recess 16, adapted to receive the heel portion of an upper termed "counter", with the marginal portion of the heel end of the sole over-lying the dying-out knife, to be removed by the descent thereupon of the reciprocating presser block 17. One of the knife carriers 2, is provided on the inner wall of its base with a stop screw $x$ adapted to strike the wall of the opposite carrier as said carriers approach one another, acting to limit their inward motion, and thereby, since the stop screw may be adjustably moved in and out of its carrier, vary the size and shape of the heel shaped recess and the curve of the rounding knife to approximate to the desired size and shape of heel seat to be cut.

When the machine is operated, the oscillation of the rock shaft 9, and its arms 8 and 11, cause the rearwardly extended carrier arms 5 to swing in and out, the separation of the roller carrying ends thereof, swinging the front portions of the carrier flanges 14, toward one another against the sole and causing the flexible rounding knife to curve or be shaped to fit or correspond with the size and shape of the shoe counter then within the heel shaped recess 16.

The presser block, 17 (Figs. 1 to 5), is adjustably carried by a cross head 18, which is mounted to reciprocate on the vertical guide rods 19 and 20, secured to the bed B, coil springs 21 interposed on said guide rods normally supporting the cross head in elevated position. It being also desirable to vary the width of the outstanding edge that is to remain upon the sole around the heel seat or heel portion thereof, even with the same size of uppers, back and side adjusting gages are provided, the former (see Figs. 4, 6, 7 and 9) comprising, in the present instance, a spring controlled bell crank 22, having the shape of an inverted T (Fig. 6), pivoted at the base of and within the heel shaped recess, 16, presented between said arc-shaped flanges, the pivoting pin 23, therefor, being carried by the head of said hinge bolt or the pivot stud 4. The vertical arm 24, of this bell crank (Fig. 6), is received and stands between longitudinal recesses formed in the opposing edges at the back of the carrier flanges 14, said arm 24, at its upper end, having a flat forked end 25 normally held against the inner side of the rear or heel portion of the rounding knife by a coil spring, 26, which is interposed between an inner horizontal arm, 27, of said bell crank and the bed B. The outer horizontal arm, 28, of this bell crank is provided with a stop or adjusting screw, 29, having a hand wheel, 29$^a$, by which it may be elevated or depressed. This screw acts to limit the depression of its carrying arm and the inward swing of said forked end, and by turning said hand wheel, said forked end 25, may be adjusted to any given distance from said knife. In inserting the counter of the inverted shoe into said heel shaped recess, 16, as described, the back of said counter strikes the forked end of the gage thereby preventing the further approach of the heel end of said counter toward the knife and thus determining the width of sole edge to be left protruding or extending from the rear end of the heel seat. This arrangement enables the operator to remove more or less marginal material $s'$, about the rear end of the heel seat $s$ and to vary the shape of heel seat as desired (see Figs. 14–15).

The side gages (Figs. 7, 8 and 10), are each provided with a tubular head 30, adapted to slide on a tubular stud 31 projecting outwardly horizontally from the top of the arc-shaped flanges adjacent the mouth of the heel shaped recess, said stud 31 being threaded interiorly to receive a differential screw 32 carried by said head for speedily moving said head toward or from the knife. This head, 30, is also formed (see Fig. 8) with an arm, 33, curved to embrace the outer front end of said arc-shaped flanges 14, its inner end carrying the gage proper 34, which by its outer face rests against the front portion of the inner edge of the heel shaped recess and by its inner face contacts with and positions the sides of the heel portion of the upper when inserted therein, relative to the cutting edge of the knife. Each of said gages may be moved toward or from the knife by means of the adjusting screws, 32, as described, to die out or round the sides of the heel seat or sole at any distance from the upper, leaving the protruding portion of the sole of uniform width, on each side or variable as desired. To prevent said gage, 34, turning on its stud, 31, during adjustment or at other times (see Figs. 1, 4, 6 and 7) each of its arms, 33, is provided with a depending portion, 34$^a$, having an opening, at its lower end loosely to receive therein a horizontally projecting pin, 35, of said flange, 14, and on which said arm and its gage is guided in moving toward or from said flange. The curved knife, 1, and the heel shaped recess, 16, presented by the flanges on its supporting carriers, are adapted to be shaped to fit any ordinary shoe counter, a coil spring 36, being interposed for said purpose between a hook, 37, formed upon the front ends of said carriers, 2, and normally acting to swing them toward each other and thereby make the heel shaped recess smaller with a corresponding and consequent curvature in the knife edge. This recess is normally open to receive the shoe and is closed onto or shaped to the counter periodically immediately preceding the approach of the presser block, 17, and while it remains in engagement with the rounding knife.

To prevent the piling up or accumulation of the removed marginal portions or scraps upon the supporting flanges of the carrier, one of them is provided with a vertical scrap knife, 38, (Figs. 4 and 8) pivoted thereto at its base, having its receding and inclined cutting edge, 38ª (Fig. 16) depressed below that of the rounding knife and at right angles thereto. The front edge of this scrap knife is received into a shallow recess or nick 39 in the back of the rounding knife and is forced into constant engagement therewith by spring 40, to prevent scraps or particles thereof getting between the knives to interfere with their subsequent operations.

To reciprocate the block carrying cross-head, 18, a drive-shaft, 41, (Figs. 1, 2 and 11) journaled in bearings at the base of the standard, is geared to drive a counter-shaft, 42, having a crank, 43, operating a connecting-rod 44, the upper end of the latter having a usual screw, 45, with its hand-wheel, 46, for adjustably connecting it with a yoke 47. This yoke, which is held in adjusted position on said connecting-rod by a set-screw, 48, is provided at its ends with vertical arms, 49, pivotally connected to adjustable eye-bolts, 50, which are threaded into the opposite ends of the block-carrying cross-head, 18. By means of the upper and lower adjustments, the up-and-down throw of the cross-head may be suitably regulated, and oscillations or lateral vibrations thereof prevented. To prevent the knife-edge from cutting always against the same face of the presser block, and to provide for a uniform wear thereof, the block, 17, is adjustably secured by bolts, 51, upon a carrier, 52, slidably mounted upon the rear face of said cross-head 18 (Fig. 4), and reciprocated by a cam 53, operatively mounted thereon. This block-carrier 52, is provided with a horizontal, dove-tailed groove, 54, (see Fig. 5) fitting and adapted to reciprocate upon a horizontal and correspondingly shaped guide 55, on the rear face of the cross-head. The upper face of said block-carrier is threaded to receive adjusting bolts, 56, bearing upon a gib 57, interposed between the opposed faces of the groove and guide to take up and compensate for the wear of the bearing surfaces thereof and to prevent the block from having any vertical motion other than that of the cross-head.

The operating cam, 53 (Figs. 4 and 5), is loosely mounted upon a stud, 58, screwed into a boss, 59, formed on the rear face of the cross-head, and secured therein by a set screw, 60. The edge or operating face of said cam 53, bears against the side edge of the block-carrier, 52, and to maintain said carrier in contact with said cam-face, a coil-spring 61, see Fig. 4, is interposed between the opposite sides of said carrier and a stud, 62, of the cross-head, said spring encircling a guide rod, 63, which is secured to the said stud 62, and enters a socket 64, formed in the opposite end of the carrier 52, in which said rod is adapted to slide. To the outer face of this cam 53, (Fig. 5), suitably secured as by pins, 66, is a ratchet-wheel 67, confined on the cam-stud 62, by a collar, 68, formed thereon and received in a recess in the outer face of said ratchet-wheel 67. Immediately exterior to the ratchet-wheel and loosely mounted on the same cam-stud, 62, is a pawl-carrying-lever, 69, pivotally carrying at its upper end the pawl 70, which is maintained in operative engagement with said attaching wheel by a coil-spring 71, interposed between said pawl and a pin, 72, secured to said pawl-carrying-lever 69. The lower arm of this lever 69, is provided with a segmental rack, 73, which is engaged and operated by a segmental gear 74, formed on the inner end, 75, of an actuating rod 76, (Fig. 4), said geared end being pivoted in a bearing, 77, formed on a bracket arm, 78 extending rearwardly from the cross-head, 18. The outer end of this actuating rod is pivotally connected to a hanger, 79, depending from a head, 80, secured upon the upper end of an extension of the guide-rod 20. By this arrangement, the geared end, 74, of said actuating rod 76 rises and falls as the cross head 18 is reciprocated causing it to turn or roll in its bearing, 77, and by its gear teeth, 74, to oscillate said segmental carrier, 73, and the pawl lever, 69, dragging the pawl, 70, over one or more of the teeth of the ratchet-wheel, 67. When the cross-head rises, the pawl lever, 69, will move in the opposite direction, its pawl, 70, engaging the teeth of said ratchet wheel, 67, to rotate it and its attached cam, 53, thereby to move the presser block. The reciprocation of the cross-head, 18, thus produces a gradual rotation of the cam 53, on its stud, 62, thereby sliding the presser block, 17, by its carrier, 52, gradually back and forth on the cross-head, 18, to present at each blow a new or unused part of the block face to the dying-out knife, to receive the cut to be made thereby. All of the operating face of the presser block is thus eventually brought in contact with the dying-out knife, so that the cutting effect may be clean and the wear on the block uniform. To provide suitable clearance for the pin 72 and spring 71, as the block carrier moves toward them, the edge of the block carrier adjacent or opposite thereto is suitably recessed as at 81.

To start the machine (see Figs. 1, 2, 3 and 11), a suitable treadle, 82, is provided and which is pivotally connected with the rear leg, a, of the standard A. This treadle adjustably supports a brake, 83, having a curved or arc shaped friction surface normally bearing upon the lower cylindrical surface of the pulley or collar, 84, secured to the drive shaft, 41, said brake, 83, normally acting to prevent rotation thereof. The treadle, 82, is normally held in elevated position by a tension spring, 85, (Figs. 1 and 2) interposed between the base of the standard and a horizontal arm, 86, pivotally connected to the treadle and fixedly secured to a front-to-back rock-shaft, 87, horizontally mounted at the base of the standard, below the drive-shaft.

Projecting from the rock-shaft, 87, and directly below the drive-shaft (see Figs. 1, 2, 3, 11 and 12) are the curved arms, 88, 89, of a yoke, each of which adjustably carries at its free end a curved yoke or fork designated by reference numerals, 90, 91, respectively upon the drawings, said forks engaging a circumferential groove, 92, in a collar, 93, on the drive-shaft, 41. The outer end of this collar has a semi-circular, circumferential groove, 94 (Fig. 11) to receive the end of the long arm of a lever, 95 pivoted to a lug, 96, which is formed upon the inner wall of a loose pulley, 97, loosely mounted on the drive-shaft. The short arm, 98, of this lever extends into a slot 99, in the pulley, 97, (see Fig. 13), and carries at its outer end an adjusting screw, 100 (Fig. 4), to bear upon a rectangular block, 101, (see Figs. 11 and 13), which is carried in a rectangular opening formed in an inner lug, 102, projecting from the inner face of said pulley, 97. The under or inner face of this block has a V, or wedge-shaped recess, 103, (Fig. 13), to receive the slant or cam faces of the upturned ends 104, of a friction band, 105, carried in a rectangular circumferential groove, (Fig. 11) on the tubular end of a collar, 107, keyed to the drive-shaft, the tubular end providing a bearing for an interiorly-formed hub, 108, of said pulley, 97. This pulley, being loosely mounted, is free to rotate on the drive-shaft until depression of the treadle swings the rock-shaft, 87, and its yoke to the left, causing the drive-shaft collar 93, to slide to the left, moving with it the long arm of the lever 95. This forces the short arm, 98, downward and depresses the block 101, to bring the ends 104, of the friction-clutch-band together to bind the loose pulley 97, to the fixed collar, 107, which being always belted to a power-driven shaft, will turn the fixed pulley to rotate the drive-shaft and operate the reciprocating mechanism.

To prevent stopping the machine until the presser-block has descended to die out a heel-seat and has returned to its elevated position, the outer end of the yoke arm 88, (Figs. 11 and 12) carries a roller, 109, running upon and operated by the side face of a cam, 109$^a$, mounted on the countershaft, 42, said cam preventing said rock shaft 87, swinging outwardly to release the friction-clutch, until said roller 109, reaches a depression, 110, formed in the cam surface. This depression 110, is so positioned on the cam that the clutch can only be released when the cross-head 18, is elevated. The treadle being connected with the said rock-shaft, through its arm 86, cannot be elevated by the spring 85, until the rock-shaft is permitted to swing as described, hence, the machine is automatic in operation, when once started by the depression of its treadle, 82, until the release of said friction pulley-clutch and the application of the brake stops the machine, after a single reciprocation of the cross-head, 18. The operator, however, may keep his foot pressed down upon the treadle to cause repeated reciprocations of the cross-head; but whenever said treadle is released, the machine will only stop with the cross-head and presser-block in elevated position.

Fig. 3 illustrates an embodiment of my invention as applied to a twin machine adapted for use in working upon rights and lefts and comprising the same features as the single machine. In this construction, the presser block carrier, 52′, is provided with two depending portions, 52$^a$, each of which adjustably carries its presser block 17, to engage the rounding knife beneath it, said carrier 52′ being moved by a cam and operating mechanism like that used in the single machine. Two knives, two sets of supporting carriers therefor, with their rearwardly extended roller carrying arms are provided, the rock-shaft, as herein shown, having two sets of vertical cam faced arms 8, the remaining elements of the machine being like those of the single machine and operating in the same manner. It will be readily understood, however, that by this machine, the heel seats of the right shoe may be cut or curved differently from those of the left to conform to a desired shape and also that each rounding knife by means of its gages may be made to produce a uniformly curved or shaped heel upon both shoes.

My machine is operated as follows: A shoe upper having an attached sole is inverted, and the heel portion or counter thereof is inserted and bottomed in the recess or pocket between the wings of the knives and against the forked end of the rear gage, with the sides of the shoe counter between the side gages, each of said gages, having been adjusted to cause the knife to remove the marginal material at the desired distance from the counter. When in this position, the marginal portion s' of the heel seat s (Figs. 14 and 15) rests upon and overlies the said knife. The operator then depresses the treadle, releasing the brake and actuating the clutch to start the machine. The rotation of the counter shaft and its crank moves the connecting rod to oscillate the rock shaft and its cam arms, thereby enabling and forcing the arms of the knife supporting carriers to swing in and out through the action of said cam arm and the carrier spring, respectively clamping the shoe counter between the gages in the desired adjustment immediately preceding the approach of the presser block. The descent of the latter forces the leather of the sole upon the edge of the rounding knife and removes it from the sole as desired. As said block rises, the cam displaces it laterally, the rotation of the counter shaft forcing the front end of the carriers to swing outwardly thereby releasing the shoe and as the counter shaft reaches its initial position the treadle is elevated by its spring, the pulley clutch released and the machine brake applied simultaneously therewith, so that the machine will always stop with the presser block in its elevated position. The scrap or marginal portions removed by the rounding knife are adapted by their crescent shape to accumulate about the outer sides of the knife supporting flanges, this action being prevented by the cutting action of the scrap knife which cuts the scrap in two enabling it to fall apart or away from the knife or its supports.

In using the twin machine the gages may be adjusted so that one rounding knife will shape the heel seat for a right shoe, the other for a left. One or two operators may be employed for placing the shoes and furthermore both rounding knives may be adjusted to cut rights or both lefts as desired, and as is readily apparent either knife may be used alone or both simultaneously. This machine enables heel seats to be died out in the manner described with a greater speed and accuracy than is possible with machines in which the heel seats are shaped or cut by a rotary knife or cutter by the action of a rounding knife traveling about the edges of the heel seat.

My machine is useful in dying-out marginal portions from leather, or other material to a shape approximating that presented by the edge of the knife, and it is apparent that the knife-supporting plates may be given any desired shape or separation and that while I have described an embodiment of my invention in a machine particularly adapted to rough-rounding or die-out heel-seats of shoes, in which one or two dies are used, obviously any number may be employed my invention not being restricted in this respect nor to its use in connection with the manufacture of shoes.

Claims.

1. A rough-rounding machine comprising, in combination, a curved dying-out knife, knife-supports, a common pivot on which said supports are mounted to swing about the same center, a presser-block, and means to move the block and supports, one relative to the other.

2. A rough-rounding machine comprising, in combination, a curved dying-out knife having supports, a common pivot on which said supports are mounted to swing about the same center, means to vary the curve of said knife by swinging the supports toward or from one another, a block, and means to move the supported knife and block, one relative to the other.

3. A rough-rounding machine comprising, in combination, a dying-out knife, a block, means to move one relative to the other, means to move the block, gradually, transversely relative to the knife in one direction and separate means to return said block to starting position.

4. A rough-rounding machine comprising, in combination, a curved dying-out knife, a pair of knife-supports mounted upon a common pivot beneath the knife and presenting a recess having a curved periphery, means to swing the knife-supports toward or from one another on their common center to vary the size and shape of the recess and the curve of the knife, a presser block, and means to move the supported knife and block, one relative to the other.

5. In a rough-rounding machine, a dying-out knife, a block-carrier, a presser-block mounted thereon, a reciprocatory block-carrying cross-head, a cam on said cross-head, yielding means to hold the carrier against the cam, means for reciprocating the cross-head, and means operated thereby for causing the cam to slide the presser block laterally.

6. In a rough-rounding machine for the heel-seats of shoes, a curved dying-out knife, knife-supports, a common pivot on which said supports are mounted to swing about the same center, and means for turning them thereon to shape the curve of the knife to different sizes of heel-seats.

7. A rough-rounding machine comprising a drive-shaft and means for operating it, a rock-shaft, cam means thereon, knife carriers operatively connected therewith, a flexible curved knife supported thereby having its cutting edge shaped to the periphery of a shoe heel and means for shaping the curve of said knife edge to correspond to different shapes and sizes of heels.

8. A rough-rounding machine for cutting soles of boots and shoes, comprising a curved dying-out knife presenting a U shaped recess, gages within said knife for positioning the shoe relatively thereto, a die block, and means for moving said knife and block one relative to the other, to round the end of a sole.

9. In a rough-rounding machine, a curved knife presenting a U shaped recess, an end gage to limit the approach of a shoe upper to the bottom of said recess, and side gages for positioning the shoe relative to the sides of the knife.

10. In a rough-rounding machine, a curved knife presenting a U shaped recess, an adjustable end gage to limit the approach of a shoe upper to the bottom of said recess, and side gages for positioning the shoe relative to the sides of the knife.

11. In a rough-rounding machine, a curved knife presenting a U shaped recess, and adjustable end and side gages to limit the approach of a shoe upper to the bottom of said recess, and for positioning the shoe relative to the sides of the knife.

12. A rough-rounding machine comprising a rounding die constructed and arranged to present a U-shaped cutting edge and a U-shaped recess to receive a shoe counter, and side gages for said die, each having a differential adjusting screw to expedite adjustment thereof.

13. A machine of the type described, comprising a U-shaped knife constructed and arranged to receive and approximately fit the end of a lasted shoe, a cutting edge of said knife furnishing a seat for the marginal portion of a shoe sole, gages to position the sole on the edge of said knife, a cutting block, and means to cause relative approach of said knife and block to cause the sole edge outside said knife to be trimmed off without a substantial movement of the knife and shoe, one relative to the other.

14. In a machine of the type described, a U-shaped rounding knife and a pivoted spring controlled scrap knife arranged at the back of said knife substantially as shown and described.

15. In a rough rounding machine, a knife presenting a U-shaped recess to receive the shoe, and means for governing the depth to which the shoe may be inserted in said recess.

16. A rough rounding machine comprising, a rounding die constructed and arranged to present a U-shaped recess to receive the shoe, and means within the recess for varying the effective width of opening of said recess.

17. In a rough rounding machine, a knife presenting a U-shaped recess to receive the shoe, and adjustable gages for contacting with the shoe and governing the relative movement of the shoe and knife toward each other in determining the extension edge to be retained.

18. In a rough rounding machine, a knife presenting a U-shaped recess to receive the shoe, and a gage located within said recess to determine the relative positions of the knife and shoe end.

19. In a rough rounding machine, the combination, with a knife, a cutting block, and means for causing relative movement of said knife and block, of means for moving said knife into a predetermined position with respect to the work prior to the cutting operation, and means for varying said position.

20. In a rough rounding machine, the combination, with a knife, a cutting block, and means for causing relative movement of said knife and block, of means for causing said knife to assume a configuration bearing a predetermined relation to the contour of the work prior to the cutting operation, and means for varying said relation.

21. In a rough rounding machine, the combination with a rounding knife, of a gage carried by said knife and adapted to engage the shoe to determine the relative position of said knife and shoe, means for moving said knife and gage into operative position with respect to a shoe, a cutting block, and means for relatively moving the knife and block.

22. In a rough rounding machine, the combination, with a curved dying-out knife, of a pair of knife supports, yielding means to swing said knife supports toward one another to cause said knife to assume a desired curvature, and separate means for separating said supports.

23. In a rough rounding machine of the character described, the combination of a curved and flexible dying-out knife to conform to the desired contour of the work, knife supporting means for sustaining the knife in cutting position, a cross head carrying a dying-out block, means for moving the cross-head and block toward and from the dying-out knife, and automatic means acting independent of cross-head movement for curving the knife to the desired contour.

24. In a rough rounding machine of the character described, the combination of a stationarily supported curved and flexible dying-out knife to conform to the desired contour of the work, knife supporting means for sustaining the knife in cutting position, a cross head carrying a dying-out block, means for moving the cross head and block toward and from the dying-out knife, and automatic means acting independent of cross-head movement for curving the knife to the desired contour.

25. In a rough rounding machine of the character described, the combination of a stationary curved and flexible dying-out knife on the edge of which the marginal portion of a shoe sole may be held to position the sole for the dying-out operation, a movable dying-out block opposed to said stationary dying-out knife, means for moving the dying-out block toward the knife to cut the marginal portion of the sole held on the stationary knife, and means acting automatically and independent of block movement for shaping the knife to the desired contour.

26. In a rough rounding machine of the character described, the combination of a stationary curved and flexible dying-out knife on the edge of which the marginal portion of a shoe sole may be held to position the sole for the dying-out operation, a movable dying-out block opposed to said stationary dying-out knife, means for moving the dying-out block toward the knife to cut the marginal portion of the sole held on the stationary knife, a driving shaft, and means operated by said shaft independent of relative movement between the knife and block for shaping the knife to the desired contour.

27. In a machine of the class described, the combination with a rounding knife, of a pivoted scrap knife, constructed and arranged to operate upon the scrap subsequently to its removal from the work, and means for maintaining said scrap knife in engagement with said rounding knife.

28. In a machine for rounding shoe soles, the combination of a stationary flexible knife on which the sole to be rounded may be placed and supported, a cutting block movable toward and from the stationary flexible knife, and means acting to first cause the flexible knife to conform to the shape desired and subsequent to such shaping movement of the knife to cause the cutting block to be moved toward the stationary flexible knife.

In testimony whereof, I have signed my name to this specification, in the presence of two subscribing witnesses.

JOHN J. HEYS.

Witnesses:
MAURICE V. BRESNAHAN,
FREDERICK L. EMERY.

---

Copies of this patent may be obtained for five cents each, by addressing the "Commissioner of Patents, Washington, D. C."